United States Patent [19]

Kurakake et al.

[11] Patent Number: 4,859,920
[45] Date of Patent: Aug. 22, 1989

[54] INTERFACE SYSTEM FOR SERVO CONTROLLER

[75] Inventors: Mitsuo Kurakake, Hino; Keiji Sakamoto; Yukio Toyosawa, both of Hachioji, all of Japan

[73] Assignee: Fanuc Ltd, Minamitsuru, Japan

[21] Appl. No.: 890,856

[22] PCT Filed: Jan. 11, 1986

[86] PCT No.: PCT/JP86/00009

§ 371 Date: Jul. 14, 1986

§ 102(e) Date: Jul. 14, 1986

[87] PCT Pub. No.: WO86/04159

PCT Pub. Date: Jul. 17, 1986

[30] Foreign Application Priority Data

Jan. 12, 1985 [JP] Japan ................................ 60-003701

[51] Int. Cl.⁴ .......................... H02P 7/68; G05B 19/18
[52] U.S. Cl. .................................... 318/567; 318/569; 318/599
[58] Field of Search ............... 318/562, 599, 567, 568, 318/569

[56] References Cited

U.S. PATENT DOCUMENTS

| | | | |
|---|---|---|---|
| 3,666,930 | 5/1972 | McDaniel | 318/562 |
| 4,240,016 | 12/1980 | Inaba | 318/562 |
| 4,257,103 | 3/1981 | Suzuki | 318/562 X |
| 4,433,383 | 2/1984 | Maurer | 318/562 X |
| 4,454,454 | 6/1984 | Valentine | 318/293 |
| 4,459,655 | 7/1984 | Willemin | 364/132 |
| 4,523,134 | 6/1985 | Kinoshita | 318/599 X |
| 4,631,689 | 12/1986 | Arimura | 318/562 X |

FOREIGN PATENT DOCUMENTS 56-152005 11/1981 Japan.

Primary Examiner—Bentsu Ro
Attorney, Agent, or Firm—Staas & Halsey

[57] ABSTRACT

An interface system for a servo controller has a speed controller (7), a current controller (9), etc., which have heretofore been disposed on the side of a servomotor, disposed in a control circuit (15) on the side of an NC apparatus. The present position and speed data from the servomotor are fed back and are stored in a common RAM, and control signals for a driver circuit, such as an inverter (12), are supplied from the NC apparatus side to the servomotor side. A system bus on the NC apparatus side is directly connected to a local bus on the servomotor side.

6 Claims, 2 Drawing Sheets

INTERFACE SYSTEM FOR SERVO CONTROLLER

BACKGROUND OF THE INVENTION

1. Field of the Invention

The present invention relates to an interface system for a servo controller, between a servo system for driving a load such as a machine tool with a plurality of servomotors and a numerical control apparatus.

2. Description of the Related Art

In the above-mentioned field, servomotors are driven by command signals from a numerical control apparatus (hereinafter referred to as an "NC apparatus") or the like for accurately controlling a multi-axis machine tool or the like. Such servomotors have conventionally been controlled by an analog servo systems. With the recent advance of computerized control technology, various efforts have been made for efficiently controlling a plurality of servomotors with a single control apparatus.

FIG. 2 of the accompanying drawings is a block diagram of a servomotor control circuit and driver circuit. A control circuit 1 on the side of an NC apparatus is connected to a system bus line of a servo control microprocessor (servo CPU) so that servo system operation can be determined. The control circuit 1 comprises a memory 2 for reading in a position command, an arithmetic unit 3 for processing the position command and a present position signal that is fed back, and a positioning controller 4 for issuing a speed command VCMD based on the result of the arithmetic operation. A speed control circuit 5 on the side of a servomotor includes an arithmetic unit 6 for processing the speed command VCMD and a speed signal which is fed back, a speed controller 7, a current loop processor 8, a current controller 9, and an alarm processing circuit 10. Pulse width modulation (PWM) signals from the current controller 9 are supplied through an insulated amplifier 11 to an inverter 12 composed of a transistor bridge for driving a servomotor 13 with a determined drive current.

Designated at 14 is a detector such as a rotary encoder for detecting the speed and the present position of the servomotor.

The control circuit 1 receives data such as a position command from the servo CPU connected through a common RAM to a main CPU in the form of a microprocessor which effects sequential processing, and is also supplied with the speed and present position data fed back from the servomotor, through an interface circuit coupled to a data bus of the servo CPU.

The speed control circuit 5, which drives the inverter 12 connected to the servomotor 13, effects prescribed feedback control for a current and a speed on the servomotor 13. There are as many servomotors 13 as the number of the axes of the machine tool to be controlled. Where DC servomotors are employed, four transistors of the driver circuit shown in FIG. 3 are driven by the PWM signals A through D from the speed control circuit 5.

With the aforesaid conventional servo controller interface system, there are required as many speed control circuits 5 as the number of the axes of the machine tool which are to be servo-controlled. For highly accurate servo control, data should be transferred at a high speed between the NC apparatus and the speed control circuit 5 for the servo motor. Therefore, the interface circuit is complex out of necessity, and the maintenance of the hardware in general, and particularly that connected to the servomotor is difficult.

SUMMARY OF THE INVENTION

It is an object of the present invention to provide an interface system for a servo controller in the form of a microprocessor, which effectively utilizes time-sharing processing in digital control of servomotors, for achieving multi-axis time-sharing control with a low-cost servo controller of a simple circuit arrangement, without lowering the accuracy of the servo controller in the form of a microprocessor.

According to the present invention, there is provided an interface system for a servo controller which processes a position command signal from a numerical control apparatus and data fed back from a servomotor to control the servomotor, the interface system comprising a control circuit on the side of the numerical control apparatus for being supplied with a current value and speed data for the servomotor and for generating control signals for the current, speed, and position of the servomotor, and a driver circuit on the side of the servomotor, composed of a plurality of switching elements controllable by the control signals from the control circuit.

With the interface system for a servo controller according to the present invention, the servo controller can easily be software-implemented irrespective of the number of axes of a servo system to be servo-controlled, and multiple axes can be controlled on a time-sharing basis by a microprocessor, resulting in reduction of hardware.

DESCRIPTION OF THE PREFERRED EMBODIMENT

An embodiment of the present invention will hereinafter be described in specific detail with reference to the drawings.

Figure 1:
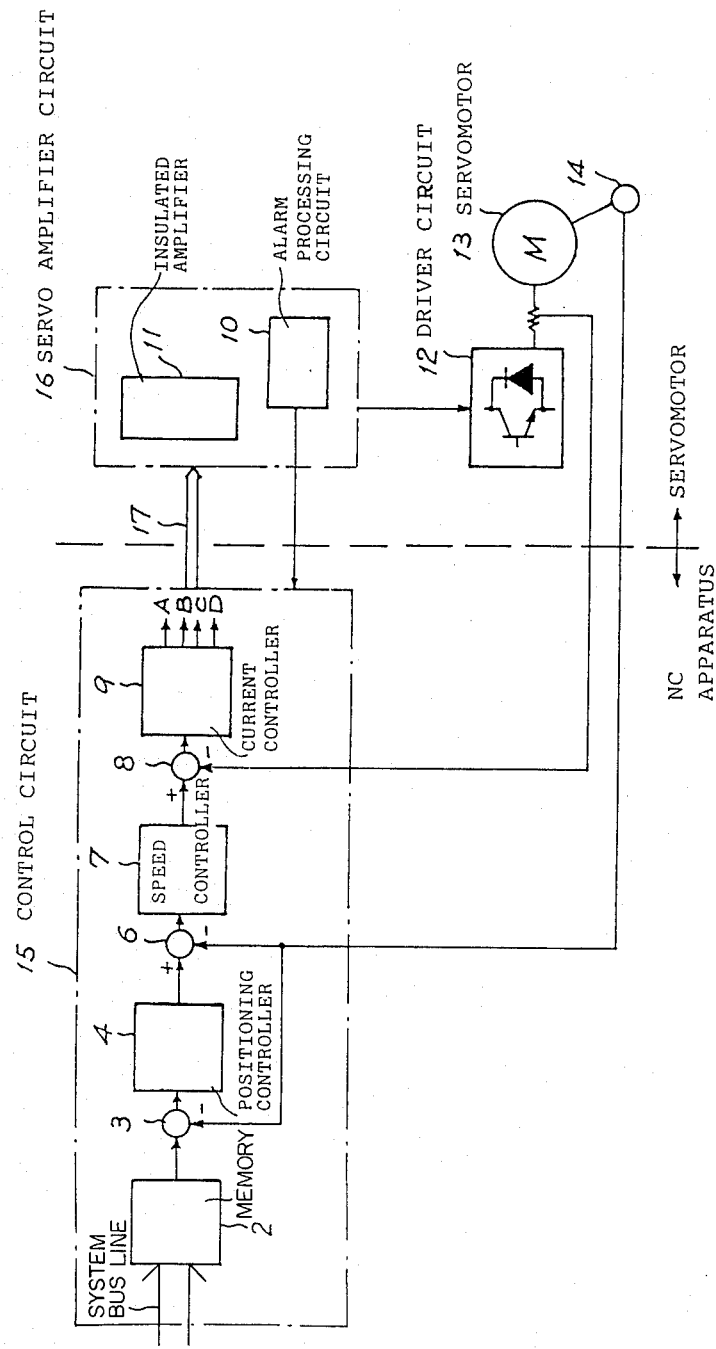
FIG. 1 is a block diagram of an embodiment of the present invention.
Figure 2:
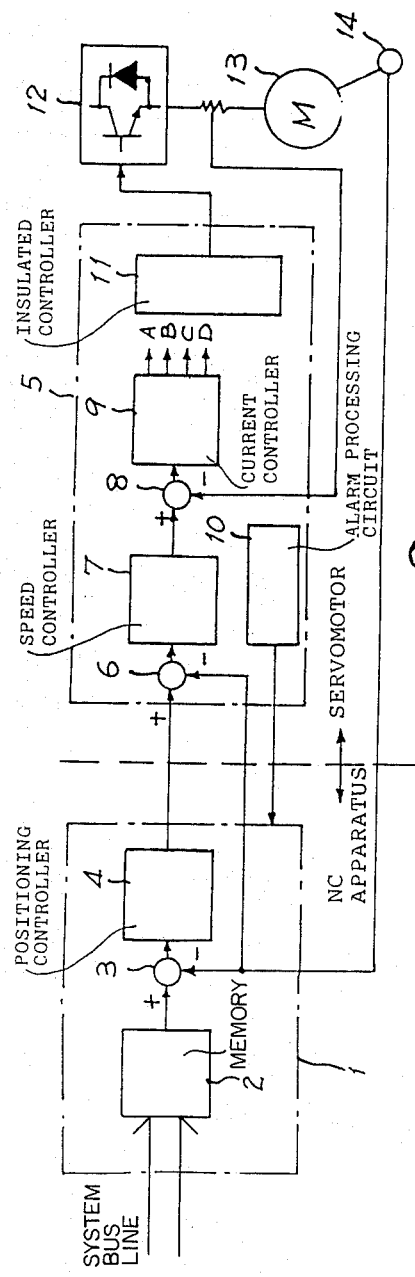
FIG. 2 is a block diagram of a conventional interface system for a servo controller.
Figure 3:
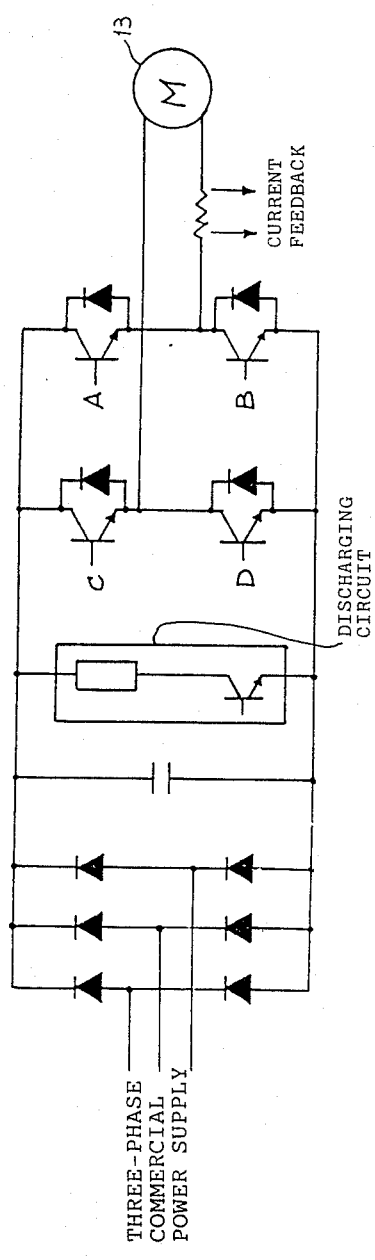
FIG. 3 is a diagram of a DC servomotor driver circuit.

FIG. 1 is a block diagram of an embodiment of the present invention. A control circuit 15 comprises a memory 2 for reading in a position command, an arithmetic unit 3 for processing the position command and a present position signal that is fed back and computing an error therebetween, a positioning controller 4 for issuing a speed command VCMD based on the result of the signal processing, an arithmetic unit 6 for processing the speed command VCMD and a speed signal that is fed back, a speed controller 7, a current loop processor 8, and a current controller 9.

A servo amplifier circuit 16 on the side of a servomotor has an insulated amplifier 11 and an alarm processing circuit 10, and is connected to the control circuit 15 through a prescribed number of data lines 17. PWM signals A through D are supplied via the data lines 17 and the insulated amplifier 11 to an inverter 12 which serves as a driver circuit for a servomotor 13.

The control circuit 15 for controlling the current, speed, and position of the servomotor 13 is disposed, together with a servo CPU, a main CPU, and a common RAM, on the side of an NC apparatus. Therefore, a local bus on the side of the servomotor can be coupled directly to a system bus of the main CPU. The inverter 12 may be composed of only a final-stage driver element such as a power transistor. Most of the complex control circuit elements may be disposed together on the NC apparatus side, whereas only a minimum number of circuit elements, such as the servo amplifier circuit 16 and the power transistor, are disposed on the side of the servomotor.

With the servo controller interface system thus arranged, a control mechanism, which has heretofore been disposed on the the servomotor side for current and speed control, is disposed on the NC apparatus side. Therefore, even if the number of axes of a servo system is increased, data to be fed back therefrom may be stored in the common RAM connected to the system bus line of the servo CPU. As a result, the interface between the servo system and the NC apparatus is not complicated. Mutiple axes can be controlled on a time-sharing basis without impairing the accuracy of a servo controller in the form of a microprocessor.

The present invention is not limited to the servo system employing a DC motor as described in the aforesaid embodiment, but is also applicable to a servo system employing an AC motor.

As described above, the interface system for a servo controller according to the present invention allows the servo controller to be easily software-implemented irrespective of the number of axes of a servo system to be servo-controlled, also allows multiple axes to be controlled on a time-sharing basis by a microprocessor, and can reduce hardware. Therefore, the interface system is preferably applied to robots and machine tools which are to be controlled highly accurately.

What is claimed is:

1. An interface system for a servo controller, having components both in a numerical control apparatus and outside the numerical control apparatus, for processing position command signals from a microprocessor of the numerical control apparatus and position, speed and current data fed back from a plurality of servomotors for controlling the servomotors, said interface system comprising:
    a control circuit in the numerical control apparatus for generating control signals for each of the servomotors based on the position command signals from the microprocessor and the position, speed and current data fed back from each of the servomotors; and
    a plurality of driver circuits, one corresponding to each of the servomotors, situated outside the numerical control apparatus and connected to the numerical control apparatus by a local bus, each of said driver circuits having a plurality of switching circuits, said driver circuits being controlled by the control signals from said control circuit.

2. An interface system according to claim 1, wherein said control circuit comprises a memory for storing the position command signals, a processor for computing an error between the position command signals and the feedback data from each of the servomotors, a positioning controller for issuing a speed command, a speed controller, and a current controller.

3. An interface system for a servo controller according to claim 1, wherein the control signals are pulse width modulation signals.

4. An interface system for a servo controller according to claim 3, further comprising servo amplifier circuits, one corresponding to each of the servomotors, situated outside the numerical control apparatus and coupled between said control circuit and said driver circuits, for amplifying the pulse width modulation signals from said control circuit.

5. An interface system for a servo controller according to claim 1, wherein said control circuit further comprises:
    memory means for storing the position command signals supplied by the microprocessor;
    an arithmetic unit for processing the position command signals and the present position data fed back from each of the servomotors;
    a positioning controller for issuing speed commands based on the output from said arithmetic unit;
    a second arithmetic unit for processing the speed commands from said positioning controller and the speed data fed back from each of the servomotors;
    a speed controller for issuing current commands based on the output of said second arithmetic unit;
    a current loop processor for processing the current commands and the current data fed back from each of the servomotors; and
    a current controller for issuing the control signals in the form of pulse width modulation signals based on the output from said current loop processor.

6. A interface system for a servo controller according to claim 1, wherein the local bus includes a prescribed number of data lines and each of said driver circuits include an inverter for driving the corresponding servomotor.

* * * * *